(12) United States Patent
Thayer et al.

(10) Patent No.: US 7,004,403 B2
(45) Date of Patent: Feb. 28, 2006

(54) LOW-VOLUME NURSERY POT IRRIGATION APPARATUS AND METHOD

(76) Inventors: Susan Thayer, 508 Sweet Bay Circle Dr., Winter Haven, FL (US) 33884; Timothy Wert, 10042 Rockridge Rd., Lakeland, FL (US) 33810

( * ) Notice: Subject to any disclaimer, the term of this patent is extended or adjusted under 35 U.S.C. 154(b) by 183 days.

(21) Appl. No.: 10/444,944

(22) Filed: May 23, 2003

(65) Prior Publication Data

US 2004/0108393 A1 Jun. 10, 2004

Related U.S. Application Data

(60) Provisional application No. 60/383,046, filed on May 24, 2002.

(51) Int. Cl.
*A62C 31/22* (2006.01)

(52) U.S. Cl. .................. 239/271; 239/276; 239/280; 47/48.5; 248/87

(58) Field of Classification Search ............. 239/271, 239/273, 276, 279, 280, 285, 542, 543, 544; 47/48.5; 248/87
See application file for complete search history.

(56) References Cited

U.S. PATENT DOCUMENTS

| 3,638,863 A | * | 2/1972 | Roberts | 239/276 |
| 3,788,552 A | * | 1/1974 | Roberts | 239/276 |
| 3,823,905 A | * | 7/1974 | Ray | 248/87 |
| 4,850,555 A | * | 7/1989 | Lemkin et al. | 248/87 |
| 4,852,806 A | * | 8/1989 | Zeman | 239/276 |
| 4,944,476 A | * | 7/1990 | Olson | 248/87 |
| 6,588,680 B1 | * | 7/2003 | Cameron et al. | 239/276 |

* cited by examiner

*Primary Examiner*—David A. Scherbel
*Assistant Examiner*—Seth Barney
(74) *Attorney, Agent, or Firm*—Allen, Dyer, Doppelt, Milbrath & Gilchrist, P.A.

(57) ABSTRACT

An irrigation spray stake for plants grown in pots utilizes an elongated stake member having an upper extremity and a lower extremity adapted to be inserted into the soil, with a spray head adjacent the upper extremity of the stake member, with an arrow or similar feature along the stake member between the upper and lower extremities to indicate the predetermined spraying direction of the spray head. The arrow or similar feature may be formed as a plate which rests against the surface of the soil, with the back edge of the plate resting against the inner surface of the nursery pot into which the stake is extended.

22 Claims, 2 Drawing Sheets

LOW-VOLUME NURSERY POT IRRIGATION APPARATUS AND METHOD

PRIORITY

This application claims priority under provisional patent application Ser. No. 60/383,046 filed on May 24, 2002.

BACKGROUND OF THE INVENTION

1. Field of the Invention

The present invention relates generally to low-volume irrigation systems and techniques and specifically to low-volume apparatus and methods useful for watering potted plants in a nursery, greenhouse, retail store or similar locations.

2. Description of the Background

There are numerous existing approaches to the irrigation of living plants. The term "low-volume irrigation" (sometimes referred to as "micro-irrigation") is used in connection with a class of irrigation systems, apparatus and methods designed to apply a small quantity of water to an individual plant or a small number of immediately adjacent plants, usually at the base of the plant. One type of low-volume irrigation system uses a small spray head, referred to generically as a "microjet," which is removably attached to the top of a stake pushed into the ground adjacent the base of the plant. Water is fed through the spray head via a length of flexible plastic tubing from the main feed line. In a typical low-volume installation such as in an orange grove, for example, there may be hundreds or even thousands of individual spray heads and associated tubing connected together in the irrigation system. Therefore, because the quantities of water in each feed line and through the corresponding spray head is small, the size and dimensions of these elements (e.g., spray head, stake and tubing) may also be correspondingly small and fabricated from inexpensive plastics.

There have been efforts in the past to apply low-volume irrigation techniques to the watering of plants being grown in movable pots, usually in a nursery, greenhouse, retail store or similar location where the plants are being maintained or grown for sale.

SUMMARY OF THE INVENTION

The present invention is directed to irrigation apparatus and methods which can be used to provide low-volume irrigation to plants being grown in pots at a nursery, greenhouse, retail store or similar location in a low cost facile manner, and which can be rapidly and accurately installed in a pot to an appropriate soil depth and with the spray head oriented in the correct direction. In a preferred embodiment of the present invention, these objectives are achieved in a unitary spray stake having (a) a unitary molded spray head adjacent an upper extremity; (b) the spray head having a low-angle spray pattern which reduced overspray; (c) a directional feature along the length of the stake which permits the correct orientation of the spray head to be quickly identified during insertion; (d) a height indication feature which may be combined with the directional feature and which indicates the proper height of the stake in the pot; (e) a pot edge location feature which may be combined with the correct orientation and height features to permit the stake to be properly located relative to the edge of the pot; (f) a side shut-off arm along the portion of the stake which will be above the soil when the stake is in use to permit the end of the flexible tubing to be fitted in order to selectively interdict the flow of water; (g) a steep, two-step thread pattern on an inlet to the spray head and on the shut-off arm to permit tubing of different diameters to be repeatedly threaded onto the inlet and the arm in a rapid manner; and (h) wide longitudinal ribs and notches along the length of the stake to insure the stake remains firmly in place when inserted in the pot soil.

DESCRIPTION OF THE PREFERRED EMBODIMENT

Figures 1, 2:
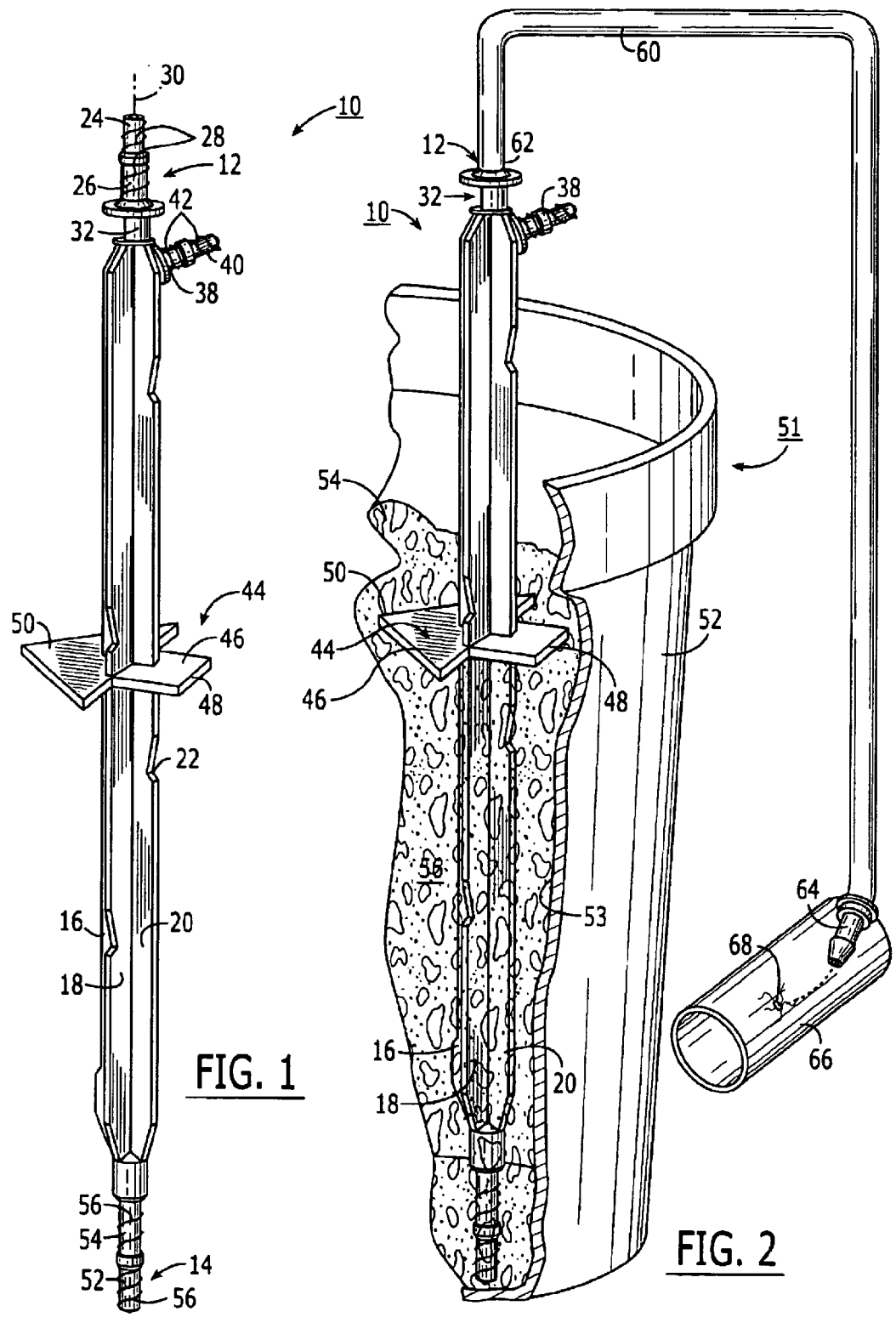
FIG. 1 is a perspective view of the preferred embodiment of the present invention.
FIG. 2 is perspective view of the stake of FIG. 1 shown in a typical nursery pot installation with associated feed tubing, and with a portion of the nursery pot cut away.

Referring now to FIG. 1, a low-volume nursery pot irrigation stake in accordance with the present invention is referred to generally by the reference numeral 10. The stake 10 is formed of a unitary molded elongated member having an upper extremity 12, a lower extremity 14 and longitudinal ribs, including ribs 16, 18 and 20. One or more notches 22 along the ribs facilitate maintaining the stake firmly in the soil once installed.

The stake 10 includes at the upper extremity 12 a two-step fitting for receiving feed tubing 60 (FIG. 2). Referring now to both FIGS. 1 and 3, the two-step fitting comprises a first portion 24 of smaller cross-sectional dimension than a larger portion 26. Steep threads 28 surround both portions 24, 26. The respective portions 24, 26 have a corresponding initial portion 25, 27, respectively, of slightly greater cross-sectional dimension to more firmly engage plastic tubing fitted thereon. The upper extremity 12 includes a central bore therethrough for permitting water to flow to a spray head 32, described below. The central bore is represented by dashed line 30 in FIGS. 1 and 3.

Figure 3:
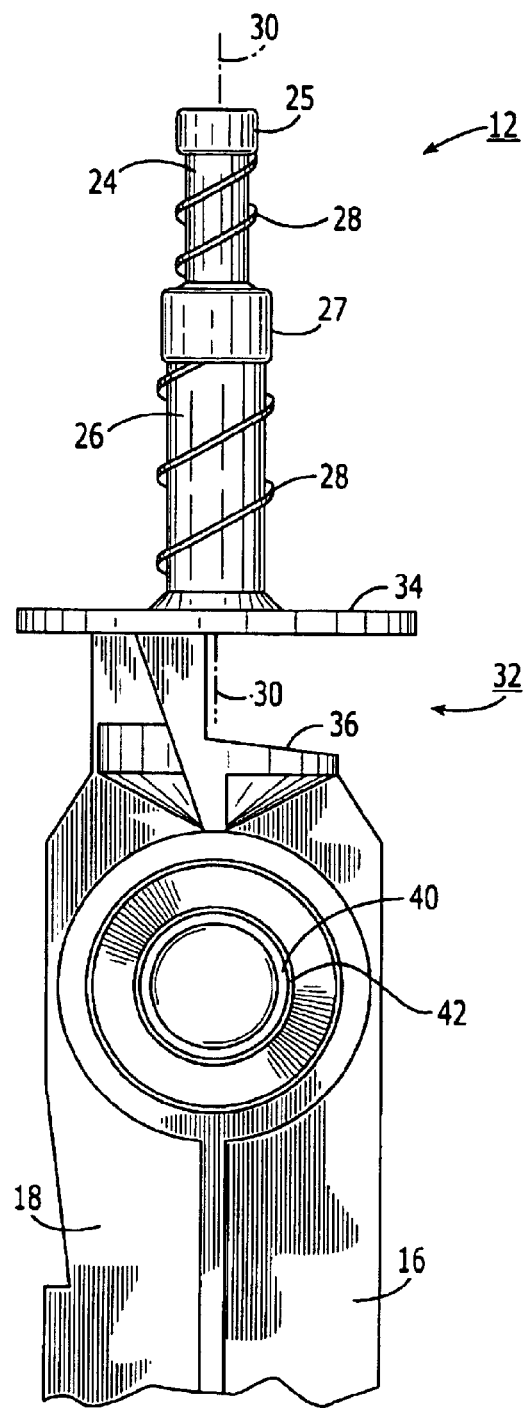
FIG. 3 is a side view, partially cut away, illustrating the spray head portion of the stake of FIG. 1.

A spray head 32 is fitted on the stake 10 at the upper end 12 and in communication with the bore 30, so that water flowing through the upper end 12 exits into the spray head. With continued reference to FIG. 3, the spray head 32 includes an upper deflector plate 34 and a lower spray surface 36. As shown in FIG. 3, the spray surface 36 is angled slightly downwardly and outwardly from the central bore 30. The deflector plate 34 extends beyond the extremity of the spray surface 36, and assists in preventing overspray outside of the pot. The spray head 32 provides any number of preselectd spray patterns, and may be designed for any desired flow rate.

Referring again to FIG. 1, the stake 10 includes a side shut-off arm 38 which includes a two-step fitting like that described with reference to the upper end 12, the shut-off arm 38 having a smaller portion 40 and a larger portion 42. It will of course be understood that the shut-off arm 38 does not include a bore, in order that the arm may temporarily interdict the flow of water when the tubing 60 is fixed to the shut-off arm 38.

As described in the above summary, the preferred embodiment also includes means providing directional, height and pot edge location features. In the preferred embodiment shown in the drawing, these features are achieved with a plate member, referred to generally with reference numeral 44, and which extends laterally from a mid-point along the stake 10. Preferably, the plate member 44 is molded together with the stake 10, although a separate plate member may also be snapped onto the stake as an alternative.

The plate member 44 has an upper surface 46 and opposing bottom surface (not numbered), a rear edge 48 and a forward extremity 50. In the specific arrangement shown in FIG. 1, the plate member 44 is shaped as an arrow pointing in the direction of spray from the spray head 32, with the forward extremity 50 forming the point of the arrow. In use, the plate member 44 serves at least three functions: first, the bottom of the plate member 44 identifies the correct soil depth to which the stake 10 should be extended into the soil contained in the pot; second, the rear edge 48 of the plate member 44 locates the correct distance from the inside periphery of the pot for correct placement of the stake 10; and third, the direction of the arrow represented by extremity 50 is pointed in the same direction as the spray pattern of the spray head 32, thereby permitting the correct direction of the spray pattern to be quickly identified. It will of course be understood by those skilled in the art that other forms of the plate member 44 are quite possible; for example, the plate member may simply be a disk with a mark or arrow printed or molded onto the upper surface of the disk to indicate correct direction, with the lateral dimension of the disk indicating the correct position of the stake relative to the pot and with the bottom of the disk serving to indicate correct soil height.

The bottom end 14 of the stake 10 likewise includes a two-step fitting, including smaller portion 52 and larger portion 54, with corresponding threads 56.

The manner in which the irrigation stake 10 in FIG. 1 is utilized in a nursery pot installation will now be described with reference to FIG. 2. The stake 10 is inserted through the top surface 54 of the soil 56 contained within a nursery pot 51 having an outer, vertical surface 52 and a corresponding inner surface 53. As shown, the stake 10 is installed with the bottom of the plate member 44 against the surface 54 of the soil 56, and with the back edge 48 of the plate member 44 against the inside wall 53 of the pot 51. By orienting the arrow 50 of the plate member 44 toward the middle of the pot 51, the installer can insure that the spray head 32 is accurately pointed toward the plant being grown in the pot 51.

Flexible plastic tubing 60 having an open end 62 is fitted onto the upper extremity 12 of the stake 10. A fitting 64 on the opposite end of the flexible tubing 60 is adapted to be inserted into a hole 68 in a main feed line 66, to provide water through the tube 60 and out of the spray head 32 in the direction of the plant located in the pot 51.

As discussed above, it will be appreciated by those skilled in the art that various modifications may be made in the design of the nursery pot irrigation stake and method described above, without departing from the spirit and scope of the present invention. By way of example and without limitation, the directional plate member 44 may be replaced by a directional clip which attaches to the stake 10 and to the plant pot, and which may also provide the heights and pot edge functions.

What is claimed is:

1. An irrigation spray stake for plants grown in pots, comprising:
    an elongated stake member having an upper extremity and a lower extremity adapted to be inserted into soil in a plant pot;
    a spray head adjacent the upper extremity of the stake member;
    means for spraying fluids through the spray head in a predetermined direction; and
    means along the stake member between the upper and lower extremities which indicates the predetermined spraying direction of the spraying head, the direction indicating means including a plate member along and generally lateral to the direction of elongation of the stake member with an arrow formed with the plate member and oriented to indicate the predetermined spraying direction.

2. The irrigation spray stake recited in claim 1 wherein the plate member is integrally molded with the stake member.

3. The irrigation spray stake recited in claim 1 wherein the the arrow is molded in the plate member.

4. The irrigation spray stake recited in claim 1 wherein the means for spraying fluids through the spray head comprises:
    a fitting at the upper extremity of the stake member and extending generally in the direction of elongation of the stake member; and
    a bore extending through the fitting and in communication with the spray head.

5. The irrigation spray stake recited in claim 4 further comprising a multiple-step thread pattern along the fitting for permitting tubing of different diameters to be repeatedly threaded thereon.

6. The irrigation spray stake recited in claim 1 further comprising longitudinal ribs and notches along the length of the stake to insure the stake remains firmly in place when inserted into soil of the pot.

7. An irrigation spray stake for plants grown in pots, comprising:
    an elongated stake member having an upper extremity and a lower extremity adapted to be inserted into soil in a plant pot;
    a spray head adjacent the upper extremity of the stake member;
    means for spraying fluids through the spray head in a predetermined direction;
    means along the stake member between the upper and lower extremities which indicates the predetermined spraying direction of the spraying head; and
    means between the upper and lower extremities of the stake member for indicating a desired height of the stake member above the soil after insertion into a the desired height indicating means including a plate member along and pot, generally lateral to the direction of elongation of the stake member and the plate member having a flat bottom surface for indicating the desired height after the stake in inserted into soil adjacent a plant.

8. An irrigation spray stake for plants grown in pots, comprising:
    an elongated stake member having an upper extremity and a lower extremity adapted to be inserted into soil in a plant pot;
    a spray head adjacent the upper extremity of the stake member;
    means for spraying fluids through the spray head in a predetermined direction;
    a plate member along the stake member between the upper and lower extremities which indicates the predetermined spraying direction of the spraying head the plate member extending generally lateral to the direction of elongation of the stake member; and
    means between the upper and lower extremities of the stake member for locating a distance from the inside periphery of the pot, the locating means comprising a rear edge of the plate member.

9. An irrigation spray stake for plants grown in pots, comprising:

an elongated stake member having an upper extremity and a lower extremity adapted to be inserted into soil in a plant pot;

a spray head adjacent the upper extremity of the stake member;

means for spraying fluids through the spray head in a predetermined direction;

means along the stake member between the upper and lower extremities which indicates the predetermined spraying direction of the spraying head; and a shut-off arm along and extending laterally from the upper extremity of the stake.

10. An irrigation stake, comprising:

an elongated member having an upper extremity and a lower extremity; a two-step fitting at the upper extremity comprising a first portion of smaller cross-sectional dimension and a larger portion of larger cross-sectional dimension, with the first and the larger portions each having threads and a corresponding initial portion of slightly greater cross-sectional dimension;

the upper extremity having a bore;

a spray head fitted on the elongated member at the upper extremity in fluid communication with the bore, the spray head having an upper deflector plate and a lower spray surface, the upper deflector plate extending beyond the extremity of the spray surface;

the elongated member having a plate member extending laterally from a point along the elongated member between the upper extremity and lower extremity, the plate member having an upper surface, an opposing bottom surface, a rear edge, and a forward extremity; and a flexible tubing having an open end and an opposite end, the open end fitted onto the upper extremity, and the opposite end adapted for fluid communication with an irrigation fluid source.

11. The irrigation stake recited in claim 10, further comprising a side shut-off arm with a two step fitting having a smaller portion and a larger portion.

12. The irrigation stake recited in claim 10 wherein the spray head comprises means for selecting from a plurality of preset spray patterns.

13. The irrigation stake recited in claim 10, wherein the spray head comprises means for adjusting the spray flow rate.

14. The irrigation stake recited in claim 10, wherein the plate member is integrated into and an inseparable part of the elongated member.

15. The irrigation stake recited in claim 10, wherein the plate member includes a forward extremity for indicating the orientation of the spray head.

16. The irrigation stake recited in claim 10, wherein the plate member includes a rear edge dimensioned to permit proper and consistent positioning of the elongated member from a pot edge.

17. The irrigation stake recited in claim 10, wherein the spray head has a low-angle spray pattern to reduce overspray.

18. The irrigation stake recited in claim 10, further comprising means for setting the insertion depth of the irrigation stake into soil.

19. A method of using the irrigation stake recited in claim 10, comprising the steps of:

(a) inserting the elongated member through the top surface of soil contained within a nursery pot, the nursery pot having an outer, vertical surface and a corresponding inner surface;

(b) pushing the elongated member downward into the soil until the bottom surface of the plate member rests against the surface of the soil and the back edge of the plate member rests against the inner surface of the nursery pot;

(c) orienting the elongated member with the forward extremity of the plate member toward the center of the nursery pot;

(d) attaching the open end of the flexible tubing onto the two-step fitting at the upper extremity of the elongated member;

(e) attaching the opposite end of the flexible tubing in fluid communication with an irrigating fluid source; and (f) activating the irrigating fluid source to provide sufficient fluid pressure to dispense irrigating fluid through the spray head.

20. An irrigation stake, comprising:

an elongated member having an upper extremity and a lower extremity which is adapted to be extended into soil contained in a pot having a plant to be watered;

a spray head fitted on the elongated member at the upper extremity thereof;

a flexible tubing having one end fitted in fluid communication with the spray head and an opposite end which is adapted for fluid communication with an irrigation fluid source;

a plate member extending laterally from a point along the elongated member between the upper extremity and lower extremity, the plate member having an upper surface, and opposing bottom surface a rear edge and a forward extremity; and wherein the plate member functions to identify any two of the direction of fluid spray from the spray head, the desired distance of extension of the elongated member into the soil and a distance from the inside periphery of the pot to the elongated stake member.

21. The irrigation stake recited in claim 20 wherein the plate member serves to identify the direction of fluid spray from the spray head, the desired distance of extension of the elongated member into the soil and a distance from the inside periphery of the pot to the elongated stake member.

22. A method for using the irrigation stake recited in claim 20, comprising the steps of:

inserting the elongated member through the top surface of soil contained within a pot, the pot having an inner surface;

pushing the elongated member downward into the soil until the bottom surface of the plate member rests against the surface of the soil and the back edge of the plate member rests against the inner surface of the pot;

orienting the elongated member with the forward extremity of the plate member toward the desired direction of the spray from the spray head; and fitting the flexible tubing between the irrigation fluid source and the spray head in order to cause fluid to emit from the spray head in the desired direction.

* * * * *